United States Patent [19]
Ackley

[11] Patent Number: 6,164,542
[45] Date of Patent: Dec. 26, 2000

[54] METHOD AND APPARATUS FOR DECODING UNRESOLVED SYMBOL PROFILES PRODUCED FROM A REDUCED DATA SET

[75] Inventor: H. Sprague Ackley, Seattle, Wash.

[73] Assignee: Intermec IP Corp., Beverly Hills, Calif.

[21] Appl. No.: 09/185,905

[22] Filed: Nov. 3, 1998

[51] Int. Cl.[7] .................................................... G06K 7/10
[52] U.S. Cl. ............... 235/462.16; 235/454; 235/462.19; 235/462.25; 235/462.27
[58] Field of Search .................... 235/462.16, 462.19, 235/462.25, 462.27, 454

[56] References Cited

U.S. PATENT DOCUMENTS

| | | | |
|---|---|---|---|
| 4,245,152 | 1/1981 | Flurry et al. ............................. | 235/463 |
| 4,757,206 | 7/1988 | Ohta ........................................ | 235/462 |
| 5,276,315 | 1/1994 | Surka ...................................... | 235/462 |
| 5,376,780 | 12/1994 | Kleuter ................................... | 235/462 |
| 5,504,318 | 4/1996 | Joseph et al. .......................... | 235/462 |
| 5,514,858 | 5/1996 | Ackley .................................... | 235/462 |
| 5,539,191 | 7/1996 | Ackley .................................... | 235/462 |
| 5,767,497 | 6/1998 | Lei .......................................... | 235/462 |
| 5,798,513 | 8/1998 | Ackley .................................... | 235/462 |

*Primary Examiner*—Thien M. Le
*Assistant Examiner*—Jamara Franklin
*Attorney, Agent, or Firm*—Perkins Coie LLP

[57] ABSTRACT

A method and apparatus for decoding profiles which may fail to resolve narrow elements in machine-readable symbols first begins by generating a reduced information set using a high speed circuit having contrast amplitude values and segment distance values produced from a profile from the symbol. Second, closure boundaries are determined. Third, the distances between the centers of the resolved elements are determined. Thereafter, a unit distance or X-dimension is determined for 1-wide narrow elements unresolved in the profile. Based on the unit distance, a matrix is constructed for determining the number of narrow elements unresolved between two resolved elements. Based on the measured center distances and the matrix, all of the unresolved narrow elements are identified in the profile and the profile is subsequently decoded.

30 Claims, 4 Drawing Sheets

CONTRAST AMPLITUDE

SEGMENT DISTANCE

AMPLITUDE SUMMATION AND DISTANCE VALUES

| AMPL. | | CONTR. | IDENTITY | SEG. DIST. | CENTER DIST. |
|---|---|---|---|---|---|
| 46 | | | total | | |
| -24 | = | 22 | n-let | | |
| +14 | = | 36 | wide space | | ******** |
| | | | | 17 | 17 |
| -36 | = | 0 | wide bar | | ******** |
| | | | | 6 | |
| +14 | = | 14 | n-let | | 13 |
| | | | | 7 | |
| -14 | = | 0 | wide bar | | ******** |
| | | | | 14 | |
| +19 | = | 19 | n-let | | |
| | | | | 4 | |
| -1 | = | 18 | n-let | | 37 |
| | | | | 4 | |
| +1 | = | 19 | n-let | | |
| | | | | 15 | |
| -18 | = | 1 | wide bar | | ******** |
| | | | | 9 | 9 |
| +35 | = | 36 | wide space | | ******** |
| | | | | 17 | 17 |
| -36 | = | 0 | wide bar | | ******** |
| ... | | ... | ... | ... | ... |

*Fig. 6*

| AMPL. | | CONTR. | IDENTITY | SEG. DIST. | CENTER DIST. | ELEM. |
|---|---|---|---|---|---|---|
| +35 | = | 36 | +1 |  | ******** | + |
|  |  |  |  | 17 | 17 | 2 |
| -36 | = | 0 | -1 |  | ******** | - |
|  |  |  |  |  |  |  |
|  |  |  |  | 6 |  |  |
| +14 | = | 14 | n-let |  | 13 | 1 |
|  |  |  |  | 7 |  |  |
| -14 | = | 0 | -1 |  | ******** | - |
|  |  |  |  | 14 |  |  |
| +19 | = | 19 | n-let |  | 29 | 5 |
|  |  |  |  | 15 |  |  |
| -18 | = | 1 | -1 |  | ******** | - |
|  |  |  |  | 9 | 9 | 0 |
| +35 | = | 36 | +1 |  | ******** | + |
|  |  |  |  | 17 | 17 | 2 |
| -36 | = | 0 | -1 |  | ******** | - |
|  |  |  |  | 25 | 25 | 4 |
| +36 | = | 36 | +1 |  | ******** | + |
|  |  |  |  | 17 | 17 | 2 |
| -36 | = | 0 | -1 |  | ******** | - |
|  |  |  |  | 14 |  |  |
| +19 | = | 19 | n-let |  |  |  |
|  |  |  |  | 4 | 33 | 6 |
| -1 | = | 18 | n-let |  |  |  |
|  |  |  |  | 15 |  |  |
| +18 | = | 36 | +1 |  | ******** | + |
|  |  |  |  | 9 | 9 | 0 |
| -35 | = | 0 | -1 |  | ******** | - |
|  |  |  |  | 6 |  |  |
| +14 | = | 15 | n-let |  | 13 | 1 |
|  |  |  |  | 7 |  |  |
| -14 | = | 0 | -1 |  | ******** | - |
|  |  |  |  | 17 | 17 | 2 |
| +36 | = | 36 | +1 |  | ******** | + |
|  |  |  |  | 17 | 17 | 2 |
| -36 | = | 0 | -1 |  | ******** | - |
|  |  |  |  | 6 |  |  |
| +14 | = | 14 | n-let |  | 13 | 1 |
|  |  |  |  | 7 |  |  |
| -14 | = | 0 | -1 |  | ******** |  |
|  |  |  |  | 23 |  |  |
| +46 | = | 46 | QZ |  |  |  |

*Fig. 7*

METHOD AND APPARATUS FOR DECODING UNRESOLVED SYMBOL PROFILES PRODUCED FROM A REDUCED DATA SET

TECHNICAL FIELD

The present invention relates to methods and apparatus for decoding signals produced from machine-readable symbols.

BACKGROUND OF THE INVENTION

Bar code symbologies ("bar codes") are widely used for data collection. The first bar code symbologies developed, such as U.P.C., EAN, Code 39, Interleaved 2 of 5, and Code 93 can be referred to as "linear symbologies" because data in a given symbol is decoded along one axis or direction. Linear symbologies generally encode data characters as parallel arrangements of alternating, multiple-width strips of lower reflectivity or "bars" separated by the absences of such strips having higher reflectivity or "spaces." Each unique pattern of bars and spaces within a predetermined width defines a particular data character. A given linear symbol encodes several data characters along its length as several groups of unique bar and space patterns.

Simpler linear symbologies such as Code 39 employ two element widths. An "element" is a single bar or a single space, and in 2-width symbologies, each character in the symbology generally includes a combination of four narrow and wide elements: a single-width bar, a single-width space, a double-width bar or a double-width space. More complex symbologies employ a greater number of widths for each element. For example, the U.P.C. symbology employs four widths, thus allowing for a combination of eight elements. Nevertheless, each linear symbology is based on its "X-dimension," which is the nominal width dimension of the narrowest bars and spaces in the bar code symbology. The wider bars and spaces in that symbology are based on integer multiples of the X-dimension. For example, the largest element in the U.P.C. symbology is four times wider than the narrowest element.

Currently available bar code readers transmit light to a bar code, which is reflected back to a light sensor within the reader. The sensor produces a profile based signal representing the modulated light reflected from the spaces and absorbed by the bars in the bar code and thereby represents the pattern of bars and spaces in a given bar code. In a given profile, a peak generally corresponds to a space (high reflectivity), while a valley corresponds to a bar (low reflectivity, relative to a space), and the width of each peak or valley generally indicates the width of the corresponding bar or space whose reflectance produced the peak or valley. Currently available readers determine the edges in the profile, typically using an electronic thresholding or other square-wave generating circuit that converts the profile into either a high or low value. The reader then decodes the "squared-off" signal based on the transitions or edges between high and low values.

Some bar code readers employ hand-held wands which contact the surface on which the bar code is printed. Such readers often produce profiles having sharp contrast between the peaks and valleys and thus the spaces and bars represented by the profile are easily detectable by circuitry in the reader. However, wand-type readers require the wand to contact the surface on which the bar code is printed, and are thus impractical in situations where a user cannot or does not wish to physically contact the bar code. In a hand-held reader, requiring the user to manually contact each bar code is time consuming and reduces productivity. Also, the X-dimension of each symbol must be matched to resolution of the wand (typically to an optical aperture in the wand).

Non-contact bar code readers are currently available such as laser scanning and image-based readers. Laser scanning-type readers employ a scanning beam of laser light which impinges on and is reflected from a bar code. A photodetector receives the reflected light and converts it into a modulated electrical signal that comprises the profile for the bar code. Image or vision-based readers employ charge-coupled devices ("CCD"), two-dimensional semiconductor arrays, vidicons, or other suitable light receiving elements that receive an image of a bar code and, based on the light reflected therefrom, process the image to produce a profile.

Due to optical systems inherent in laser- or image-type readers, these readers have a specified depth-of-field within which bar codes can be read. Some laser-or image-type readers employ autofocus systems to increase the depth-of-field for the reader. However, even readers with autofocus systems are limited by the depth-of-field of the autofocus system. Additionally, autofocus systems are slow and costly.

If a reader scans or images a bar code out of its depth-of-field, the resulting profile will exhibit "closure." Positive ink spread in a bar code or excessive noise in a profile can also produce closure. Additionally, scanning or imaging bar codes with narrow elements that are too small for the resolution of the scanner/reader produces closure. Closure in a bar code profile is evidenced by some recognizable peaks and valleys, but also ripples in the middle of the profile. Closure in a bar code profile generally indicates that the wide elements in the profile are resolved, but that the narrow elements are unresolved. With respect to readers, a space or bar is "resolved" if the reader is able to identify a peak or valley in the profile that corresponds to the given space or bar. Some profiles may represent narrow elements by small peaks, valleys or ripples that are visually recognizable, but which are essentially undetectable by current readers.

Currently available readers are unable to decode profiles having closure. These readers employ electronic circuits such as thresholding circuits, or other methods, to find the edges of bar code elements represented in a profile. To decode each element in the bar code, these electronic circuits locate an edge of an element as a point where the reflectance in the profile reaches a fixed distance from a peak or valley. Currently available readers cannot decode profiles where the narrow elements are out of focus or lost in the profile (i.e., an "unresolved" profile or profile closure) because the narrow elements fail to produce any significant peaks or valleys and thus the electronic circuitry is unable to locate any edges in the profile corresponding to these elements. Since current electronic circuits cannot locate the narrow elements in a profile (when closure occurs), the circuits cannot decode the bar code.

Due to the shortcomings of such circuits, a user of a hand-held non-contact reader without autofocus must adjust the distance at which the user holds the reader from the bar code until the bar code is within the depth-of-field (i.e., in-focus) for the reader. Once in-focus, the circuitry can decode the bar code, but only if the symbol's size (X-dimension) is within the resolution of the reader. If a user is attempting to read bar codes at varying distances, the user must constantly move the reader to place a given bar code within focus for the reader so as to read that bar code. Consequently, while non-contact readers eliminate the need to contact the surface on which the bar codes is printed, reading each bar code is still time consuming since the user must move the reader to the particular in-focus position for the reader. If the reader is mounted in a fixed location (and lacks autofocus capabilities), and the bar codes pass by the reader at different distances, for example, when the reader is mounted above a conveyor on which boxes of varying heights are carried for reading bar codes atop the boxes, only those bar codes within the reader's fixed depth-of-field will be decoded.

SUMMARY OF THE INVENTION

The inventor has discovered methods and corresponding apparatus for decoding unresolved profiles. Such methods are described in detail in the inventor's following U.S. patents and applications: U.S. Pat. No. 5,389,770, entitled "Method And Apparatus For Decoding Unresolved Bar Code Profiles," issued Feb. 14, 1995; U.S. Pat. No. 5,486,689, entitled "Method And Apparatus For Decoding Unresolved Multi-Width Bar Code Symbology Profiles," issued Jan. 23, 1996; U.S. Pat. No. 5,514,858, entitled "Method And Apparatus For Decoding Unresolved Complex Multi-Width Bar Code Symbology Profiles," issued May 7, 1996; U.S. Pat. No. 5,539,191, entitled "Method And Apparatus For Decoding Unresolved Bar Code Profiles Using Edge Finding Circuitry," issued Jul. 23, 1996; U.S. patent application Ser. No. 08/730,474, entitled "Method And Apparatus For Enhancing Resolution Of Reflectance Signals Produced From Machine-Readable Symbols," filed Oct. 11, 1996, and U.S. patent application Ser. No. 08/759,787, entitled "Method And Apparatus For Decoding Unresolved Profiles Produced From Relief Formed Symbols," filed Dec. 3, 1996. All such methods and corresponding apparatus provide extremely accurate methods of decoding badly degraded or unresolved profiles.

A possible shortcoming of such methods is that they can require processing time, and therefore require either expensive and fast microprocessors or lead to a slower decode rate. Under one aspect of the invention, unresolved profiles can be decoded using a reduced set of information. As a result, a faster decode may result, and/or a slower microprocessor may be employed in a reader.

In a broad sense, the aspects of the present invention include a method of decoding machine-readable symbol representing encoded information. This symbol includes several relatively spaced two-dimensional geometric shapes, where the shapes and spaces between the shapes have at least first and second widths in at least one dimension. The second width is greater than the first width.

The method includes: (a) receiving light reflected from the symbol and producing an output signal therefrom that represents the shapes and spaces forming the symbol, wherein the output signal resolves at least some of the shapes or spaces having the second width, but which may fail to resolve at least some of the shapes or spaces having a first width, (b) generating a set of data from the output signal that represents only selected data from the output signal, wherein the selected data represents measurements of each of two features in the output signal, (c) determining which of the shapes and spaces are resolved based on the generated set of data, (d) generating an unresolved element table based on the determined resolved shapes and spaces and based on the generated set of data, and (e) determining the information encoded in the symbol based on the unresolved element table.

Aspects of the invention also include an apparatus for decoding the machine-readable symbol. The apparatus includes a sensor, and a receiver and processing circuit. The sensor senses the machine-readable symbol and produces an output signal therefrom that represents the shapes and spaces forming the symbol. The output signal may fail to resolve at some of the shapes and spaces of the first size.

The receiving and processing circuit receives the output signal and produces, without storing and analyzing a digital representation of the output signal, a reduced data set from the output signal that represents selected data in the output signal. The receiving and processing circuit processes the reduced data set to identify which shapes and spaces are resolved in the output signal, and produces a signal indicative of the information encoded in the machine-readable symbol based on the resolved shapes and spaces and a number of unresolved shapes and spaces of the first size therebetween.

BRIEF DESCRIPTION OF THE DRAWINGS

In the drawings, like reference numbers refer to similar elements or steps. Additionally, the most significant digit in a reference numeral for an element or step typically refers to the Figure number in which the element or step is first introduced (e.g., element 204 is first introduced in FIG. 2).

DETAILED DESCRIPTION OF THE INVENTION

A machine vision system, and in particular, an apparatus and method for decoding data collection symbols or other machine-readable images, is described in detail herein. In the following description, numerous specific details are set forth such as specific linear symbols, profiles produced therefrom, order and method of identifying elements in such symbols, etc., to provide a thorough understanding of the invention. One skilled in the relevant art, however, will readily recognize from the detailed description provided herein that the invention can be practiced without one or more of the disclosed details, or with other symbols, profiles, etc. In other instances, well-known structures and methods are not shown in detail to avoid obscuring the invention.

Figure 1:
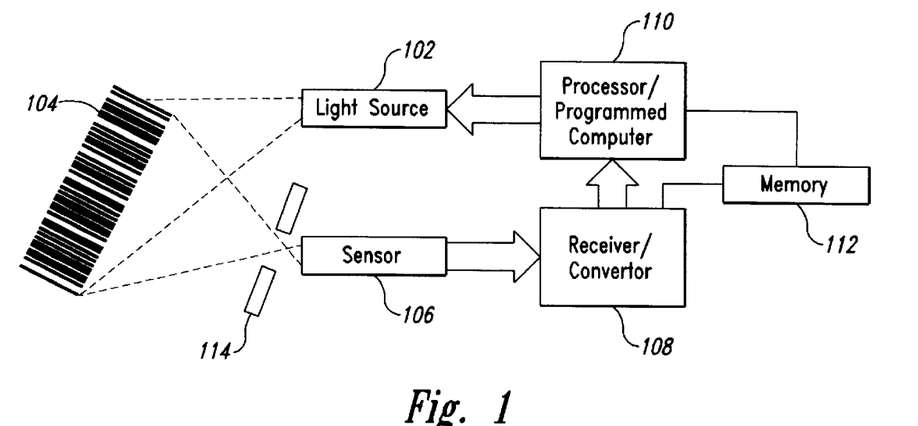
FIG. 1 shows a block diagram of a data collection symbology reader of the present invention.

As shown in FIG. 1, a data collection symbology reader 100 of the present invention includes a light source 102 that illuminates a data collection or bar code symbol 104. As used herein, a "data collection symbol" refers to a symbol from any linear, stacked, area and other machine-readable symbology including symbols formed as relief patterns. A stacked symbology, as used herein, refers to any symbology, such as PDF417, that generally employs several adjacent rows of symbols, each row having several characters defined by groups of multiple-width bars and spaces. An area symbology, as used herein, refers to any symbology, such as Data Matrix or Code One, that employs a matrix of data cells, rather than one or more rows of bars and spaces.

A sensor 106 in the reader 100 receives the light reflected from the bar symbol 104 and converts the received light into an electrical signal. For example, the light source 102 can be a laser while the sensor 106, in turn, can be a photodetector. Alternatively, the light source 102 can be an LED, flash bulb, infrared light source, or other light-emitting element, while the sensor 106 can be a one- or two-dimensional CCD, semiconductor array, vidicon, or other area imager capable of converting received light into electrical signals.

A receiver or converter 108 receives the electrical signal from the sensor 106 and converts it into a signal to be processed by a programmed computer or processor 110. Typically, the sensor 106 produces an analog signal that represents the modulated light reflected from the elements in the bar symbol 104. If the processor 110 is a digital computer, then the converter 108 may convert the profile from an analog signal produced by the sensor 106 to a multi-level digital signal that numerically represents the various amplitudes of the analog signal. The converter 108 and/or processor 110 are coupled to memory 112 for storing data, such as the profile in digital form.

Importantly, the converter 108 or processor 110 produce a reduced set of data based on the analog profile produced from the sensor 106. Indeed, the reader 100 need not store and analyze a digital representation of the entire profile. The reduced information set includes amplitude values representing a contrast between peaks and valleys in the profile, and distance values representing time between peaks and valleys. Such reduced information set is described in detail below.

Figure 2:
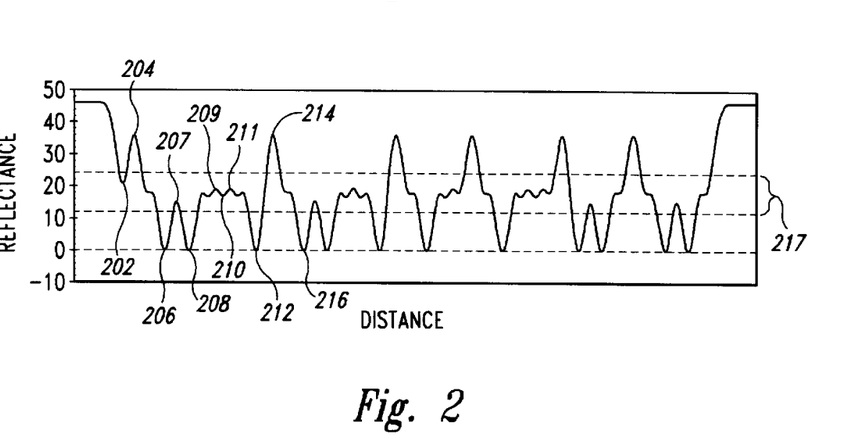
FIG. 2 shows an example of an unresolved profile produced from a symbol by the reader of FIG. 1.
Figure 8:
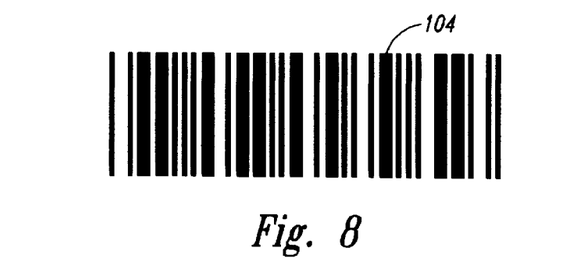
FIG. 8 is an exemplary symbol from which the profile of FIG. 2 was produced.

The sensor 106 typically produces a signal, analogous to a reflectance profile, such as that shown in FIG. 2, depending upon the modulated light received from the symbol 104 and the size of an aperture 114 preceding the light detector in the sensor. The term "profile," as generally used herein, refers to an analog signal corresponding to a spatial representation of bars and spaces in a symbol. The profile of FIG. 2 represents differences in reflectance between the elements in a symbol, such as the symbol 104, which is shown in greater detail in FIG. 8. The vertical scale in FIG. 2 corresponds to reflectance, while the horizontal scale need not be known absolutely, but rather may be in relative units, such as distance along the X-field of view of the reader 100. When decoding a profile, it is not necessary to know the distance in measurement units, but rather the reader 100 must know relative widths or distances between elements represented by peaks or valleys in the profile.

In most readers, the aperture 114 is smaller than the minimum size of an element (i.e., the X-dimension) in a data collection symbol to be read by the reader so as to produce a profile that adequately resolves all elements in the symbol. FIG. 2, however, shows an unresolved profile or closure profile produced by an aperture 114 that is greater than 2 times the X-dimension for a symbol (i.e., greater than 2×). Most bar code readers employ a circular aperture 114 whose diameter is equal to approximately 0.8×.

In general, the unresolved 1-wide or "narrow" elements in a closure profile are represented, if at all, by small peaks, valleys, inflection points or other ripples in the middle of the profile. Conversely, the resolved 2-, 3- and 4-wide or "wide" elements are represented by high peaks or low valleys, extending near the top or bottom of the profile. As a result, if two wide elements, such as a wide bar and a wide space, are separated by two narrow elements (i.e., a 1-wide space or a 1-wide bar), the resulting closure profile shows a high peak and a low valley that appear to be opposite to each other in the profile. The narrow elements fail to produce any significant peak or valley because the reader 100 fails to have adequate resolution for such narrow elements. The narrow elements produce an insignificant ripple at the middle of the profile. If a wide bar is separated from another wide bar by a single narrow element (i.e., a 1-wide space), the resulting closure profile shows two high peaks that appear to be adjacent to each other in the profile. The narrow element fails to produce a significant peak when compared to a wide element.

As is known, when the size of an aperture 114 increases, the depth-of-field decreases, so that if the size of an aperture doubles, the depth-of-field is reduced in half. The profile shown in FIG. 2 can be used to demonstrate a profile that would be produced by the sensor 106 having a fixed aperture 114 of, e.g., 0.8×, but where the profile is generated by the reader 100 at an out-of-focus distance. Additionally, the profile shown in FIG. 2 may also be used to demonstrate an out-of-focus laser scanner or wand, or a CCD-type reader having too few pixels in its CCD array to adequately resolve a given image. Furthermore, the profile shown in FIG. 2 may also be used to demonstrate a laser scanner, wand, or image-type reader that attempts to read a symbol beyond the resolution of the device (e.g., where the aperture 114 is greater than the X-dimension of the symbol being read).

Figure 3A:
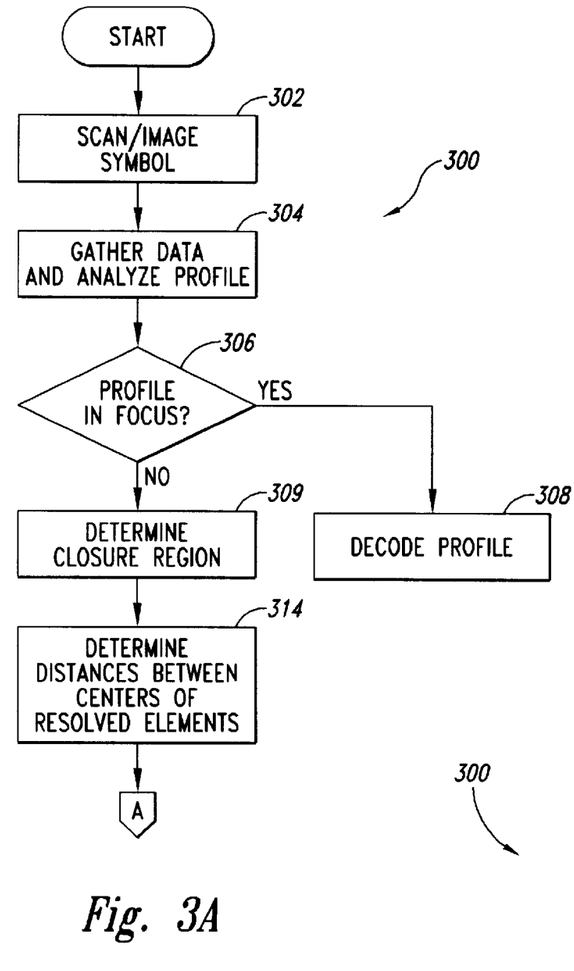
FIGS. 3A and 3B are flowcharts which together show a method of decoding unresolved profiles produced by the reader of FIG. 1.
Figure 3B:
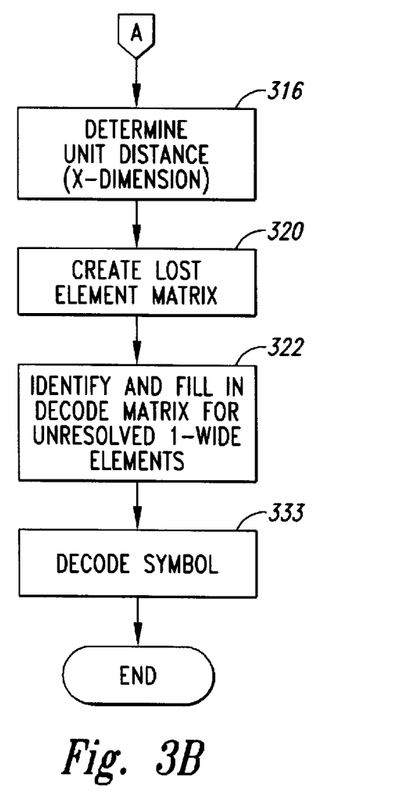

Referring now to FIGS. 3A and 3B, a routine 300 for decoding the unresolved profile shown in FIG. 2 begins in step 302 (FIG. 3A) by scanning or imaging the symbol 104 to produce a profile. The routine 300, and all routines and methods described herein, are generally performed by the processor 110 and are permanently stored within the memory 112. In step 302, the processor 110 signals the light source 102 to provide light to the symbol 104. The sensor 106 receives the modulated light reflected from the symbol 104 and produces an analog signal profile. In step 304, the converter 108 converts the analog signal to a multi-level digital signal profile or gathers data from the signal, which is then input to the processor 110. In step 306, the processor 110 determines if the profile is in-focus, i.e., all elements in the symbol 104 are resolved, and if so, in step 308, the processor decodes the profile.

If the profile exhibits closure, i.e., some elements in the symbol 104 are unresolved, then in step 309, the processor 110 analyzes the information set provided by the converter 108 to identify the higher peaks and lower valleys in the profile, to thereby determine a closure boundary. The unresolved 1-wide elements in the symbol 104 are represented, if at all, by ripples in the middle of the profile of FIG. 2, all within a "closure region" 217, shown in dashed lines in FIG. 2. Peaks or valleys outside of the closure region 217 correspond to resolved elements, while any information in the profile within the closure region is unreliable (i.e., undetectable or indistinguishable by the reader 100 from noise, symbol forming errors or damage). Under the routine 300, the processor 110 must begin to identify a closure profile, to thereby determine which elements are resolved in the profile.

Figure 4:
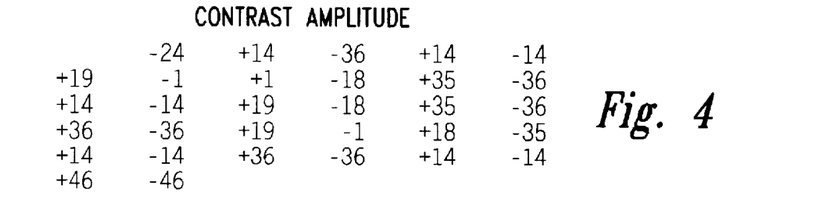
FIG. 4 is a set of contrast amplitude values produced by the reader of FIG. 1 based on the profile of FIG. 2.

The processor 60 determines the closure region by analyzing a reduced information set of data derived from the profile, namely contrast amplitude data. The contrast amplitude data is the contrast difference from one maxima (i.e., peak or valley) to the next maxima. Based on the profile of FIG. 2, the converter 108 produces a serial string of contrast amplitude values as shown in FIG. 4. While shown as a two dimensional table in FIG. 4, the converter 108 produces a serial stream of the contrast amplitude values, beginning with the first six values of −24, +14, −36, +14, −14 and +19, and ending with the last six values of +36, −36, +14, −14, +46 and −46. Negative contrast amplitude values correspond to transitions from peaks to valleys (i.e., spaces to bars), while positive contrast amplitude values correspond to transitions from valleys to peaks (i.e., bars to spaces). To ensure that the converter 108 identifies all resolved elements from the symbol 104, the converter's sensitivity is preferably increased. While such increase in sensitivity for the converter 108 may lead to extraneous transitions (between peaks and valleys), such extraneous transitions may be readily identified and eliminated based on the method described herein.

To identify the closure region 217, the processor 110 analyzes all contrast amplitude values in FIG. 4 and identifies a highest value 46 as an arbitrary starting point. Comparing only the highest value 46 with the first amplitude value of −24, a contrast value from top to bottom of the profile of FIG. 2 is 22 for the bottom of a first valley 202. The next contrast amplitude value in FIG. 4 is +14, which added to 22, provides a value of 36. This value of 36 represents a wide space, corresponding to a peak 204 in the profile of FIG. 2.

The next contrast amplitude value of −36 corresponds to the first resolved wide bar at a contrast value equal to zero (36−36=0). The first resolved bar corresponds to a valley 206 in the profile of FIG. 2. The next contrast amplitude value of +14 is a low peak, which in combination with the high valley value of 22 provides a good estimate of the closure region, being between reflectance values 14 and 22. To ensure a reliable closure region, a value of 2 is subtracted from the lower closure boundary of 14 and a value of 2 is added to the upper closure boundary of 22 to provide the closure region 217 between contrast or reflectance values of 12 and 24, as shown in FIG. 2. The processor 110 could analyze additional contrast amplitude values to provide a more reliable closure region 217, however, such a limited analysis is sufficient to provide good decode results.

After determining the closure region 217, the processor 110 in step 304 determines distances between the centers of resolved elements. Determining the center distances is relatively straightforward: any contrast amplitude value from FIG. 4 that lies within the closure region 217 is an n-let candidate, while any contrast amplitude value outside of the boundary is either a wide space or a wide bar. An n-let candidate is number 0,1,2 . . . , n of narrow elements between resolved wide elements. Determining the center distances is simply a matter of summing center distances of all n-let candidates between maxima (i.e., between peaks and valleys corresponding to resolved elements in the profile of FIG. 2). Center distances produced by the converter 108 for any extraneous transitions in the profile are simply added together as n-let candidates as the correct center distance is determined between wide elements.

Figure 5:
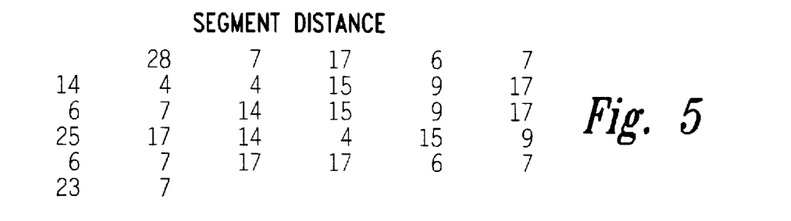
FIG. 5 is a set of segment distance values produced by the reader of FIG. 1 based on the profile of FIG. 2.

As noted above, the converter 108 produces a reduced information set including, in addition to the contrast amplitude values, segment distance values. The segment distance values correspond to time or distance (in arbitrary units) between peaks and valleys in the profile of FIG. 2. FIG. 5 shows an example of segment distance values produced by the converter 108 based on the profile of FIG. 2. Again, like the contrast amplitude values of FIG. 4, the segment distance values are a serial string of values extending from the first three segment distance values of 28, 7 and 17 (corresponding to the left hand portion of the profile) to the last three segment distance values of 7, 23 and 7 (corresponding to the right hand portion of the profile).

Figure 6:
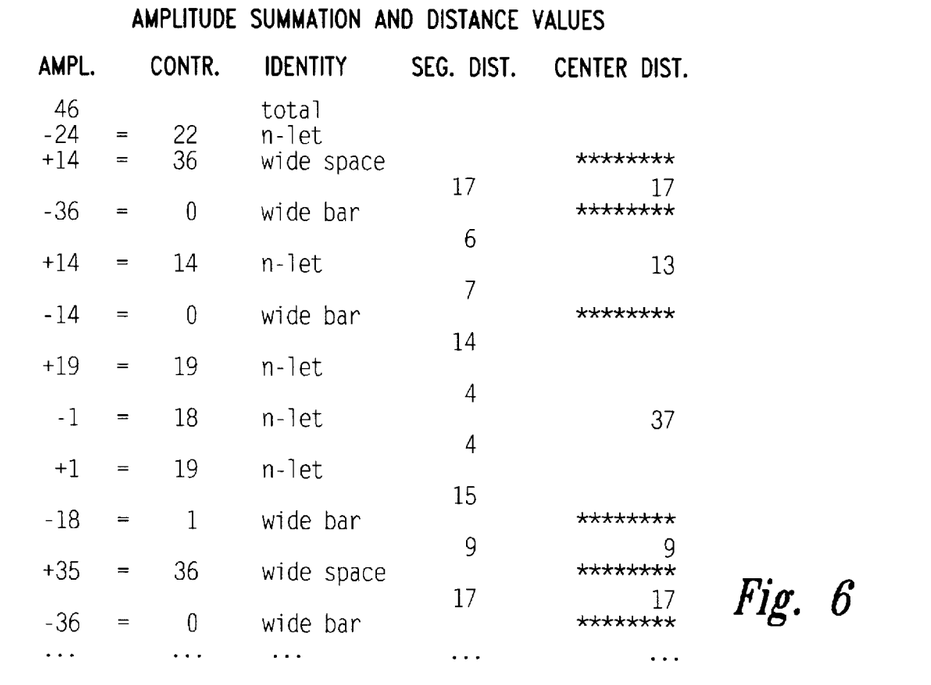
FIG. 6 is a table of amplitude summation and distance values produced from the sets of values of FIGS. 4 and 5.

FIG. 6 shows a table that represents values computed by the processor 110 in determining center distance values. The first column corresponds to the contrast amplitude values ("Ampl."). The second column corresponds to a contrast value ("Contr.") corresponding to a difference between consecutive contrast amplitude values, as computed above.

The third column in FIG. 6 corresponds to an identity of the "element" in the profile based on the contrast value. Any value within the closure region (having a contrast value between 12 and 24) is an n-let candidate. Any contrast value in the second column greater than 24 or less than 12 corresponds to a resolved wide space or wide bar, respectively. The fourth column lists the segment distance values ("Seg. Dist.") from FIG. 5, beginning with a first three valid segment distances of 17, 6 and 7. The fifth column lists center distance values ("Center Dist.") between resolved wide bars and spaces. Wide bars and spaces in the fifth column are represented by a string of asterisks (i.e., "********") For example, the first resolved element is a wide space having a contrast value of 36 (which is greater than the upper closure boundary threshold of 24).

In step 316 of FIG. 3B, the processor 60 determines a width, "unit distance," or X-dimension in the arbitrary units, of the 1-wide elements based on the smallest center distance values measured from the profile. The smallest center distance generally corresponds to a 2-wide bar next to a 2-wide space.

The profile of FIG. 2 is produced from a Code 39 symbol. The start and stop patterns for the Code 39 symbology are particularly useful in identifying a unit distance. After the first wide space in the start character, there are two narrow elements, a bar and then a space, and thereafter there is a single narrow space contained between the first two wide bars. Therefore, based on prior knowledge that the profile of FIG. 2 is from a Code 39 symbol, the processor 110 determines that a 1-wide element exists between the first two center distances of 17 and 13. Subtracting such distances yields an X-dimension or unit distance of 4 for a 1-wide element.

In step 320, the processor 110 creates a table, array or "lost element matrix" that is helpful to decoding the closure profile of FIG. 2. The lost element matrix estimates the various distances between resolved element pairs, and therefrom determines the number of 1-wide elements unresolved or "lost" between the resolved elements. The lost element matrix can be created because of the following three properties common in all 2-width symbologies such as Code 39 and Interleaved 2 of 5, as well as in all multi-width symbologies such as U.P.C. and Code 93: (1) if a resolved space immediately follows a resolved bar, then zero 1-wide elements are lost therebetween; (2) if a resolved bar follows a resolved space or vice versa, then only an even number of 1-wide elements are present therebetween; and (3) if two like resolved elements (e.g., two wide bars) are adjacent in a given profile, then only an odd number of 1-wide elements are present therebetween. As used generally herein, "opposite resolved elements" refers to a wide bar and a wide space next to each other in a given profile, while "adjacent resolved elements" refers to two wide bars or two wide spaces next to each other in the profile. The terms "opposite" and "adjacent" refer to an element's "parity" or the element's location in the profile so that "adjacent elements"

each have similar values while "opposite elements" each have very different values. Elements having opposite parity always have an even number of 1-wide elements lost therebetween while elements having adjacent parity always have an odd number of 1-wide elements lost therebetween.

Table 1 below is an example of a lost element matrix created by the processor 110 based on the X-dimension of 4 for increasing the number of n-lets 0, 1, 2 . . . .

TABLE 1

LOST ELEMENT MATRIX

| Center Dist. Value | 9 | 13 | 17 | 21 | 25 | 29 | 33 | 37 | 41 | ... |
|---|---|---|---|---|---|---|---|---|---|---|
| No. of Lost Elem. | 0 | 1 | 2 | 3 | 4 | 5 | 6 | 7 | 8 | ... |
| Element Relation | O | A | O | A | O | A | O | A | O | ... |

("O" = opposite, "A" = adjacent)

Figure 7:
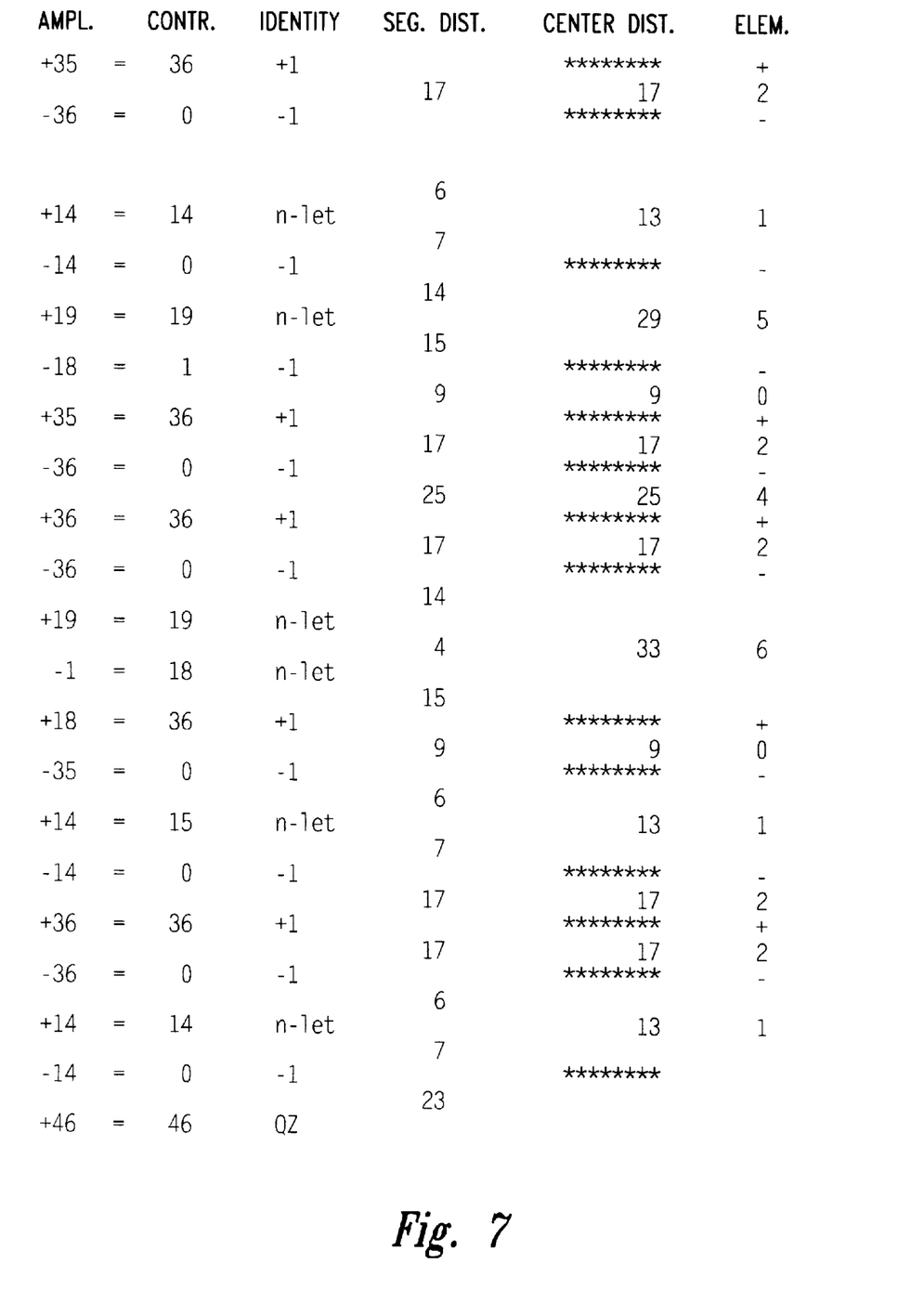
FIG. 7 is a table of amplitude summation and distance values produced from the sets of values of FIGS. 4 and 5.

In step 322, the processor 110 identifies lost 1-wide elements between resolved wide elements to fill in a decode matrix or table, such as that shown in FIG. 7. Using the lost element matrix of Table 1, the processor 110 can determine the number of narrow elements unresolved or lost between resolved wide elements. For example, referring to the table of FIG. 6 and the profile of FIG. 2, the first center distance (between a wide space 204 and a wide bar 206) is 17. From Table 1, the processor 110 determines that two elements are lost. As a "parity check," the processor 110 can confirm that the two resolved elements providing the center distance of 17 are opposite elements, i.e., a wide space adjacent to a wide bar.

Continuing with the example, two wide bars 208 and 210 are adjacent to each other, separated by a center distance of 13. Based on Table 1 above, the processor 110 determines that a single narrow element (a space 207) is lost therebetween. This wide bar to wide bar transition contains one narrow element, representing the smallest possible "adjacent" center distance. The next center distance in FIG. 6 is 37, which from Table 1 corresponds to 7 narrow elements. Correspondingly, in FIG. 2, n-let closure transitions 209, 210, and 211 were found by the processor. However, where a normal reader would identify these as three elements, this would be incorrect. The method disclosed here does not identify them until another resolved element 212 is found.

Importantly, the tolerance of determining lost elements is ±4, or an entire X-dimension. Therefore, using only a reduced set of information (contrast amplitude values and segment distance values) a processor 110 can rapidly decode unresolved profiles.

Indeed, after obtaining such a reduced information set from the profile of FIG. 2, the processor 110 performs much of the same methods described in the inventor's above-noted patents and applications.

The next wide bar to space 212 to 214 and wide space 214 to wide bar 216 transition contains zero and two narrow elements, respectively, and so on for all following center distances computed from the profile of FIG. 2. FIG. 7 shows a table of the last two contrast amplitude values, contrast values, identity values, segment distances and center distances of FIG. 6, and all subsequent values for the profile of FIG. 2. The table of FIG. 7 also includes a final element column ("Elem."), which indicates a number of lost elements between center distance values. Adapting a convenient notation, a "+" corresponds to a wide bar, while a "−" corresponds to a wide space in the element column. Therefore, a center distance 17 in FIG. 7, between the contrast amplitude values of +35 and −36 correspond to a distance between a wide bar ("+") and a wide space ("−"), resulting in two lost elements therebetween. For the first series of identified lost elements described in the example above, a string of wide bars, wide spaces, and numbers of lost elements therebetween (if any) can be represented as follows:

+2−1−7−0+2− . . .

The above notation of consecutive element widths can be converted to element width notation, which is the output of a standard read or decode before parsing into characters and converting to ASCII values. The numbers are expanded to actual numbers of narrow elements, or element widths equal to 1, while the wide elements, either a "+" or a "−" are converted to a value of 2, to thereby indicate 2-wide elements as follows:

2112121111111122112 . . .

The actual wide-to-narrow ratio (N) may be other than 2, but the method described herein is not affected by a different value for N. Those skilled in the relevant art can find that the actual ratio N is 2.25 for the example above.

In step 333, the processor 110 parses the resulting string of element widths into potential Code 39 characters as follows:

(1)21121211 1 111122112 . . .

Since the first narrow element is not explicitly determined from the decode, it is shown in parentheses. The remaining elements are immediately recognizable as the Code 39 start character. The single element by itself in the intercharacter gap and the next nine elements decode a character value of "D". The complete decode using the above method (as shown in FIG. 7) yields the following string of lost elements:

+2−1−7−0+2−1−5−0+2−4+2−6+0−1−2+2−1−

This string of elements expands into the following element widths:

(1)21121211 1 111122112 1 211111221 1 211112112 1 111112212 1 1211212(11)

Start D R A G Stop

The above string of parsed characters can be converted into their corresponding character values (shown below each corresponding element string), or checked by consulting a standard Code 39 lookup table.

As noted above, the Code 39 symbology provides particularly useful start and stop patterns for identifying the X-dimension of the symbol. Interleaved 2 of 5 symbology and Codabar symbology are other two width symbologies which can be decoded using this method. The above method is described for use with any 2-width symbologies.

Although specific embodiments of, and examples for the invention are described herein for illustrative purposes, various equivalent modifications are possible within the scope of the invention, as those skilled in the relevant art will recognize. For example, a reader employing only analog circuitry may be employed, as those skilled in the art will readily recognize based on the above detailed description and the inventor's above-noted patents and applications. Additionally, rather than setting the reader 100 to read only Code 39 symbols, the reader could automatically discriminate and identify symbols by analyzing the profile. For example, the reader 100 may identify the symbology from which a profile was generated by identifying start and stop patterns in the profile.

Furthermore, the lost element decode matrices are shown and described above as having a certain depicted form. The invention need not construct such matrices per se, as shown above, but instead simply performs the necessary routines and calculations described herein in order to decode unresolved profiles such as counting a number of loops in an iterative process to determine the number of lost elements.

The teachings provided herein of the invention can be applied to other machine vision systems, not necessarily the exemplary data collection symbology reader described above. The present invention can also be modified to employ the systems, methods and concepts of the inventor's U.S. patents or applications cited above. Indeed, an improved, more robust decode method can be employed using one or more of the concepts disclosed in the noted U.S. patents and applications. Furthermore, while the present invention produces a profile using optical apparatus, tactile or other apparatus could be employed to produce an unresolved profile decoded under the invention. Moreover, while certain operations under the invention have been described as occurring generally in a serial fashion, those skilled in the relevant art will recognize that it is entirely within the scope of the invention to conduct some operations more or less simultaneously, or even in alternative order, from that described herein.

These and other changes can be made to the invention in light of the above detailed description. In general, in the following claims, the terms used should not be construed to limit the invention to the specific embodiments disclosed in the specification and the claims, but should be construed to include all machine vision and tactile systems that operate under the claims to provide a method for accurately reading unresolved signals produced from relief patterns. Accordingly, the present invention is not limited by the disclosure, but instead its scope is to be determined entirely by reference to the following claims.

What is claimed is:

1. A method of decoding a bar code symbol representing encoded information, the bar code symbol including a plurality of relatively spaced bars having at least narrow and wide widths, and spaces between the bars having at least narrow and wide widths, the method comprising:

receiving light reflected from the bar code symbol and producing an output signal therefrom that represents the bars and spaces comprising the bar code symbol, wherein the output signal includes valleys and peaks representing the resolved bars and spaces having the wide width, respectively, but wherein the output signal may fail to resolve at least some of the bars and spaces having the narrow width;

without storing and analyzing a full representation of the output signal, producing a set of amplitude data based on amplitudes of the valleys and peaks in the output signal, and a set of feature distance data signal based on distances between the valleys and peaks in the output signal;

identifying which of the bars and spaces are resolved by defining at least one threshold and identifying amplitudes from the set of amplitude data that extend beyond the threshold;

determining a representative narrow width of the bars and spaces having the narrow width based on the identified resolved bars and spaces and the set of feature distance data;

determining a number and location of the bars and spaces having the narrow width based on the representative narrow width, the identified resolved bars and spaces and the set of feature distance data; and determining the information encoded as in the bar code symbol.

2. The method of claim 1 wherein the set of amplitude data corresponds to changes in amplitude between the valleys and peaks in the output signal, wherein defining at least one threshold includes:

subtracting adjacent amplitude data values in the set of amplitude data, and identifying a low amplitude peak and a high amplitude valley, relative to other peaks and valleys, in the set of amplitude data, wherein determining a narrow width includes determining distances between centers of the resolved bars and spaces, and wherein determining a number and location of the bars and spaces having the narrow width includes adding distance values, between identified resolved bars and spaces, in the set of feature distance data.

3. The method of claim 1 wherein the set of amplitude data corresponds to changes in amplitude between the valleys and peaks in the output signal, and wherein determining a number and location of the bars and spaces having the narrow width includes adding distance values, between identified resolved bars and spaces, in the set of feature distance data.

4. The method of claim 1 wherein determining a number and location includes:

measuring center distances between the resolved bars and spaces based on the set of feature distance data;

creating a lost element matrix that identifies a number of the bars and spaces having the narrow width that are unresolved between the resolved bars and spaces, the lost element matrix being created based on estimated center distances and the representative narrow width; and determining the number and location of the bars and spaces having the narrow width by comparing the measured center distances to the estimated center distances in the lost element matrix.

5. The method of claim 1, further comprising:

creating a decode matrix that identifies the number of bars and spaces having the narrow width that are unresolved between the resolved bars and spaces; and filling in the decode matrix with the determined number of the bars and spaces having the narrow width.

6. The method of claim 1 wherein identifying which of the bars and spaces are resolved includes: defining first and second values based on the set of amplitude data, and defining a closure region at a selected offset value from the first and second values.

7. The method of claim 1, further comprising:

identifying start or stop characters in the bar code symbol based on the output signal; and determining a type of symbology from which the bar code symbol was generated based on the identified start or stop characters in the bar code symbol;

determining if all of the bars and spaces having first and second widths are resolved before identifying which of the bars and spaces are resolved; and decoding the output signal if all of the bars and spaces having the first and second widths are resolved.

8. A method of decoding a machine-readable symbol representing encoded information, the symbol including a plurality of relatively spaced two-dimensional geometric shapes wherein at least the shapes or spaces have the second width being greater than the first width, the method comprising:

receiving light reflected from the symbol and producing an output signal therefrom that represents the shapes and spaces comprising the symbol, where in the output signal resolves at least some of the shapes or spaces having the second width, but which may fail to resolve at least some of the shapes or spaces having the first width;

generating a set a data from the output signal that represents only selected data from the output signal, wherein the selected data represents measurements of each of two features in the output signal;

determining which of the shapes and spaces are resolved based on the generated set of data;

generating an unresolved element table based on the determined resolved shapes and spaces and based on the generated set of data; and determining the information encoded in the symbol based on the unresolved element table.

9. The method of claim 8 wherein the generated set of data includes a set of amplitude data based on amplitudes of valleys and peaks in the output signal, and a set of feature distance data signal based on distances between the valleys and peaks in the output signal.

10. The method of claim 8 wherein the generated set of data includes feature distance values and amplitude data that corresponds to changes in amplitude between valleys and peaks in the output signal, wherein determining which of the shapes and spaces are resolved includes:

subtracting adjacent amplitude data values in the generated set of data, identifying a low amplitude peak and a high amplitude valley, relative to other peaks and valleys, in the amplitude data values, and defining at least one threshold based on the identified low amplitude peak and high amplitude valley; and wherein generating an unresolved element table includes determining a representative first width based on distances between centers of the resolved shapes and spaces, and adding distance values, between identified resolved bars and spaces, in the generated set of data.

11. The method of claim 8 wherein the generated set of data includes feature distance data that corresponds to distances between valleys and peaks in the output signal, and wherein generating an unresolved element table includes adding distance values between identified resolved bars and spaces in the set of feature distance data.

12. The method of claim 8 wherein generating an unresolved element table includes:

measuring center distances between the resolved shapes and spaces based on the generated set of data;

determining a representative first width;

creating a lost element table that identifies a number of the shapes and spaces having the first width that are unresolved between the resolved shapes and spaces, the lost element table being created based on estimated center distances and the representative first width; and determining the number and location of the shapes and spaces having the first width by comparing the measured center distances measured to the estimated center distances in the lost element table.

13. The method of claim 8, further comprising:

creating a decode table that identifies a number of shapes and spaces having the first width that are unresolved between the resolved shapes and spaces;

determined a number of the shapes and spaces having the first width; and filling in the decode table with the determined number of the bars and spaces having the first width.

14. The method of claim 8 wherein identifying which of the shapes and spaces are resolved includes: defining first and second values based on the set of amplitude data, and defining a closure region at a selected offset value from the first and second values.

15. The method of claim 8, further comprising:

identifying start or stop characters in the symbol based on the output signal; and determining a type of symbology from which the symbol was generated based on the identified start or stop characters in the symbol;

determining if all of the shapes and spaces having first and second widths are resolved, before determining which of the shapes and spaces are resolved; and decoding the output signal if all of the shapes and spaces having the first and second widths are resolved.

16. The method of claim 8 wherein generating a set of data includes generating derivative data from the output signal.

17. A method for decoding a machine-readable symbol representing encoded information, the machine-readable symbol including a plurality of relatively spaced shapes and spaces between the shapes, wherein at least the shapes or spaces have at least first and second sizes, wherein the first size is smaller than the second size, the method comprising:

receiving light that is reflected from the machine-readable symbol and producing an output signal therefrom, wherein the output signal may fail to resolve at least some of the shapes and spaces having the first size;

receiving the output signal and generating, without storing and analyzing a digital representation of the output signal, a reduced data set from the output signal that represents selected data from the output signal; and processing the reduced data set to identify which shapes and spaces are resolved in the output signal and producing a signal indicative of the information encoded in the machine-readable symbol based on the resolved shapes and spaces and a number of unresolved shapes and spaces of the first size therebetween.

18. The method of claim 17 wherein the generated reduced data set includes a set of amplitude data based on amplitudes of valleys and peaks in the output signal, and a set of feature distance data signal based on distances between the valleys and peaks in the output signal.

19. The method of claim 17 wherein the generated reduced data set includes feature distance values, and amplitude data that corresponds to changes in amplitude between valleys and peaks in the output signal, and wherein processing the reduced data set includes:

subtracting adjacent amplitude data values in the generated set of data;

identifying a low amplitude peak and a high amplitude valley, relative to other peaks and valleys, in the amplitude data values;

defining at least one threshold based on the identified low amplitude peak and high amplitude valley;

determining which of the shapes and spaces are resolved;

determining a representative first width based on distances between centers of the resolved shapes and spaces;

adding distance values, between identified resolved bars and spaces, in the generated set of data; and generating an unresolved element table.

20. The method of claim 17 wherein the generated reduced data set includes feature distance data that corresponds to distances between valleys and peaks in the output signal, and wherein the method further comprises:

generating an unresolved element table, and adding distance values between identified resolved bars and spaces in the set of feature distance data.

21. The method of claim 17, further comprising:

creating a decode table that identifies a number of shapes and spaces having the first width that are unresolved between the resolved shapes and spaces;

determined a number of the shapes and spaces having the first width; and filling in the decode table with the determined number of the bars and spaces having the first width.

22. The method of claim 17, further comprising:

defining first and second values based on the set of amplitude data;

defining a closure region at a selected offset value from the first and second values; and identifying which of the shapes and spaces are resolved.

23. The method of claim 17 wherein generating a set of data includes generating derivative data from the output signal.

24. An apparatus for decoding a machine-readable symbol representing encoded information, the machine-readable symbol including a plurality of relatively spaced shapes having at least first and second sizes, and the spaces between the shapes having at least first and second sizes, wherein the first size is smaller than the second size, the apparatus comprising:

a sensor that senses the machine-readable symbol and produces an output signal therefrom that represents the shapes and spaces comprising the symbol, wherein the output signal may fail to resolve at least some of the shapes and spaces having the first size;

a receiving and processing circuit that receives the output signal and produces, without storing and analyzing a digital representation of the output signal, a reduced data set from the output signal that represents selected data in the output signal, and that processes the reduced data set to identify which shapes and spaces are resolved in the output signal and produces a signal indicative of the information encoded in the machine-readable symbol based on the resolved shapes and spaces and a number of unresolved shapes and spaces of the first size therebetween.

25. The apparatus of claim 24 wherein the generated reduced data set includes a set of amplitude data based on amplitudes of valleys and peaks in the output signal, and a set of feature distance data based on distances between the valleys and peaks in the output signal.

26. The apparatus of claim 24 wherein the generated reduced data set includes feature distance values and amplitude data that corresponds to values of amplitude of valleys and peaks in the output signal, and wherein the receiving and processing circuit: subtracts adjacent amplitude data values in the set of data; identifies a low amplitude peak and a high amplitude valley, relative to other peaks and valleys, in the amplitude data values; defines at least one threshold based on the identified low amplitude peak and high amplitude valley; determines which of the shapes and spaces are resolved; determines a representative first width based on distances between centers of the resolved shapes and spaces, and adds distance values, between identified resolved bars and spaces, in the generated set of data.

27. The apparatus of claim 24 wherein the generated reduced data set includes feature distance data that corresponds to distances between valleys and peaks in the output signal, and wherein the receiving and processing circuit generates an unresolved element table and adds distance values between identified resolved bars and spaces in the set of feature distance data.

28. The apparatus of claim 24 wherein the receiving and processing circuit: defines first and second values based on the reduced data set; defines a closure region at a selected offset value from the first and second values; and, identifies which of the shapes and spaces are resolved.

29. The apparatus of claim 24 wherein the receiving and processing circuit generates a set of data that includes derivative data from the output signal.

30. The apparatus of claim 24 wherein the receiving and processing circuit includes a receiver and a processor, wherein the receiver receives the output signal as an analog waveform and produces the reduced data set therefrom, and wherein the processor receives the reduced data set from the receiver.

* * * * *